Figure 1:
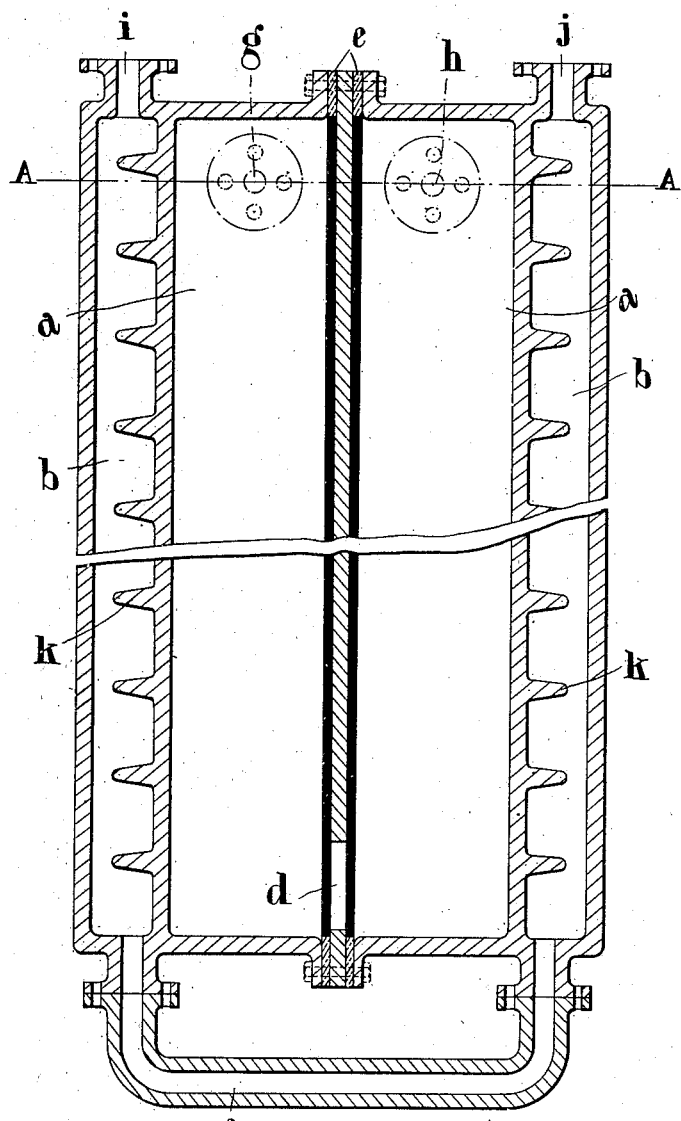

M. A. ADAM.
PREVENTION OF CORROSION.
APPLICATION FILED AUG. 31, 1920.

1,365,141.

Patented Jan. 11, 1921.
2 SHEETS—SHEET 1.

INVENTOR
M. A. Adam,
BY H. R. Kerslake
ATTORNEY

UNITED STATES PATENT OFFICE.

MATTHEW ATKINSON ADAM, OF LONDON, ENGLAND.

PREVENTION OF CORROSION.

1,365,141.　　　　Specification of Letters Patent.　　Patented Jan. 11, 1921.

Application filed August 31, 1920. Serial No. 407,249.

*To all whom it may concern:*

Be it known that I, MATTHEW ATKINSON ADAM, a subject of the King of Great Britain and Ireland, and residing at 57 and 58 Lincoln's Inn Fields, London, W. C. 2, England, have invented certain new and useful Improvements Relating to Prevention of Corrosion, of which the following is a specification.

This invention relates to the prevention of corrosion of apparatus, by arranging the apparatus, as the cathode in an electrical circuit, and by depositing electrolytically thereon a protective deposit.

The object of my present invention is to produce a metallic protective deposit for the protection of apparatus, e. g., metal tanks, pipes, pumps, heaters or the like containing or carrying corrosive metallic solutions of metals which are capable readily of yielding electrolytically a metallic protective deposit.

The invention consists in arranging apparatus, containing or carrying corrosive solutions of metals which are capable readily of yielding electrolytically a metallic protective deposit, as the cathode in an electric circuit, and applying a potential thereto so that a metallic deposit is produced and maintained notwithstanding possible dissolution of the deposit by the solution.

The invention further consists in a method of preventing or reducing the corrosive action upon metals of solutions of corrosive salts, which consists in depositing upon the part to be protected a soluble metal at a rate at least as great as the rate of dissolution of the deposit.

The invention also consists in a heater for corrosive solutions of metals which are capable readily of yielding electrolytically a metallic protective deposit including an inner iron vessel for the solution containing an anode preferably of carbon, so disposed within the vessel as to maintain contact with the solution throughout substantially the whole of its passage through the heater and an outer vessel separated from the inner vessel by a space through which heating fluid is circulated.

In carrying this invention into effect as applied by way of example to the protection of vessels used in the detinning of tinned iron in the wet way, as described in the copending application Ser. No. 407250, I make the vessel the cathode in a special circuit to which is applied a depositing potential. The solutions in proportion to their acidity tend to dissolve iron, so that iron vessels cannot be used economically for the handling of the scrap in the process of dissolving the tin therefrom, or metallic pumps or heaters for handling the working solution. In order to employ ordinary iron tanks and other apparatus, e. g., heaters or pumps of iron or other metals or alloys, I make the wetted surfaces cathode surfaces in an electric circuit, the resistance in which is adapted only to allow an extremely slow deposit, sufficient, however, at least to equal the amount of deposited tin which is dissolved by the solution. A number of anodes may be used coupled together electrically, and they may be of tin or preferably of carbon or the like.

Referring to the accompanying diagrammatic drawings—

Figure 2:
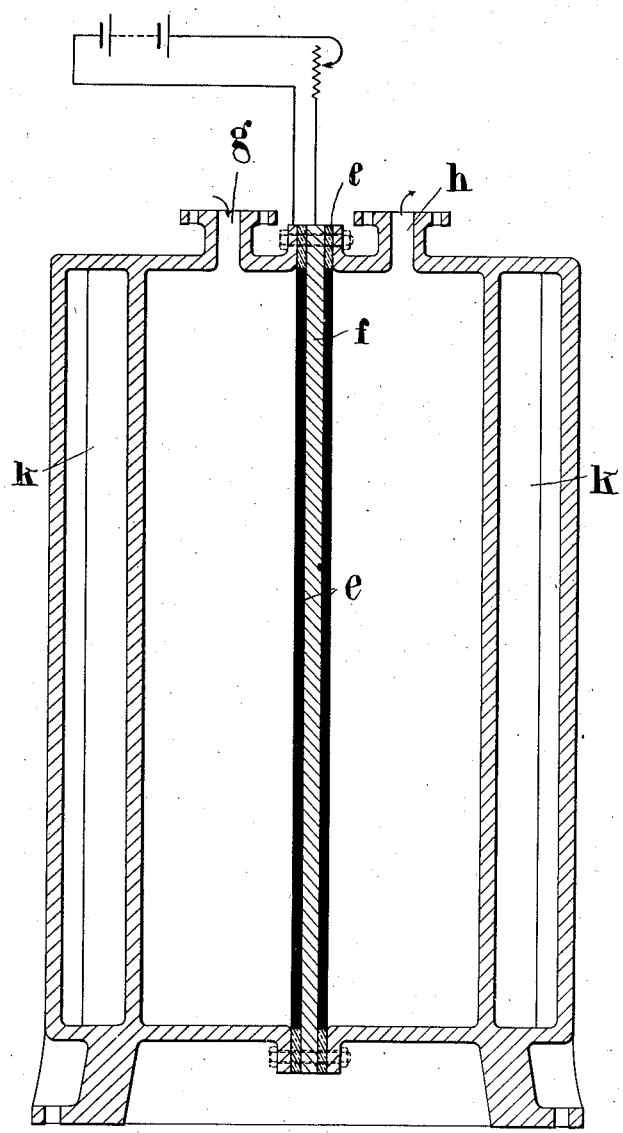

Figure 1 is a horizontal section of a convenient form of heater for heating corrosive solutions, and Fig. 2 is a section on line A—A of Fig. 1.

In applying the invention in one way for example to the making of a heater for heating tinned scrap treating fluid to the most convenient working temperature, say by steam, I construct a heater as is indicated in Figs. 1 and 2 with heating elements arranged for circulation of steam on one side and circulation of the fluid on the other, an electric circuit being provided for protection of the heater surfaces from corrosion. The preferred form of heater is constructed from two flanged cast iron troughs $a$, each having a steam jacket $b$ on the outside, the two being bolted together through two rubber joint rings $e$, one on each side of a graphite or molded carbon plate partition $f$. Inlet and outlet braches $g$ and $h$ for fluid and $i$ and $j$ for steam are provided, and communication between the two steam chambers is effected by a connecting pipe $c$, and between the two fluid chambers by a hole $d$ in the carbon anode $f$ at the end remote from the inlet and outlet branches. The partition is coupled as anode to the troughs acting as cathodes, and a tin depositing potential is applied to the circuit, so that a very small deposit of tin takes place or tends to take place on the surfaces from the fluid, at least making up for any solution of tin therefrom after the deposit has occurred. The current may be controlled conveniently by a suitable external resistance $r$.

The troughs may be externally ribbed as shown, or they may be suitably ribbed internally to baffle the flow of the fluid so as to insure its thorough contact with the heating surfaces, and the ribs may be arranged to provide as long a path as practicable for the fluid from inlet to outlet.

In this case the tops and outer portions of the ribs should be covered with enamel or other non-conducting material to prevent access thereto of the corrosive liquid. Otherwise deposition would be practically confined to these parts owing to their comparatively close proximity to the anode.

The chambers may have independent circulation if desired.

In one example of the application to tanks for detinning scrap, the scrap is contained in enameled iron baskets, and a number of carbon anodes are provided supported on the outside thereof, so connected and distributed as to insure protection of the tank which is coupled as cathode in series with a source of E. M. F. and a suitable resistance. The scrap itself may be used as the anode in order to simplify the arrangements.

It will be seen that this invention is applicable for handling metallic solutions in the winning or refining of metals.

Having now described my invention, what I claim as new and desire to secure by Letters Patent is:—

1. The method of protecting a vessel carrying corrosive solutions of metals from corrosion therein which consists in attaching an anode to the vessel and passing an electric current therethrough so that a metallic protective deposit is produced and maintained notwithstanding possible dissolution of the deposit by the corrosive solution.

2. The method of preventing or reducing the corrosive action upon metals of solutions of corrosive salts which consists in depositing upon the part to be protected a soluble metal at a rate at least as great as the rate of dissolution of the deposit.

3. A heater for corrosive solutions of metals including an inner iron vessel for the solution containing an anode, so disposed within the vessel as to maintain contact with the solution throughout substantially the whole of its passage through the heater and an outer vessel separated from the inner vessel by a space through which heating fluid may be circulated.

In testimony whereof I have signed my name to this specification.

MATTHEW ATKINSON ADAM.